No. 633,729. Patented Sept. 26, 1899.
S. PERCIVAL.
WEEDING TOOL.
(Application filed Apr. 22, 1897.)
(No Model.)
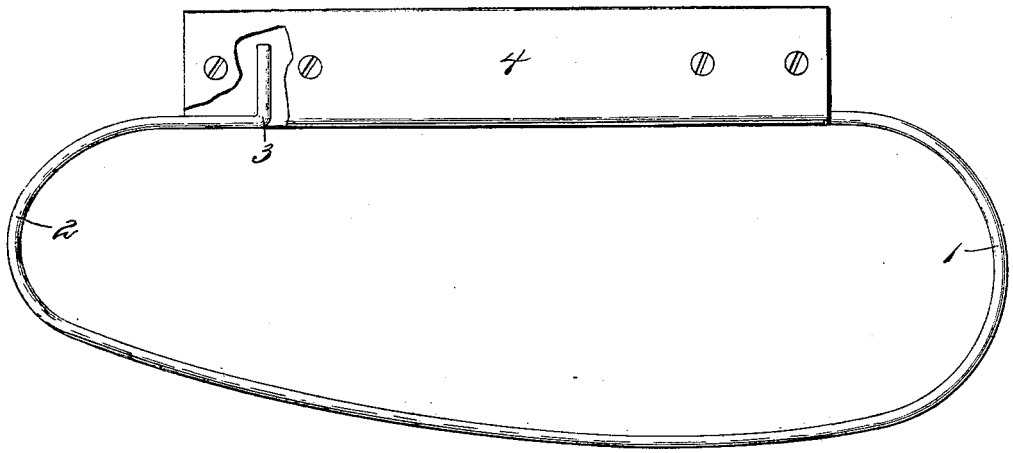
Witnesses
Milton O'Connell,
Victor J. Evans
Inventor
Sylvanus Percival,
By John Wedderburn.
Attorney

UNITED STATES PATENT OFFICE.

SYLVANUS PERCIVAL, OF BARNSTABLE, MASSACHUSETTS.

WEEDING-TOOL.

SPECIFICATION forming part of Letters Patent No. 633,729, dated September 26, 1899.

Application filed April 22, 1897. Serial No. 633,299. (No model.)

*To all whom it may concern:*

Be it known that I, SYLVANUS PERCIVAL, a citizen of the United States, residing at West Barnstable, in the county of Barnstable and State of Massachusetts, have invented certain new and useful Improvements in Weeding-Tools; and I do hereby declare the following to be a full, clear, and exact description of the invention, such as will enable others skilled in the art to which it appertains to make and use the same.

This invention has reference to a novel construction in a garden-tool, the object being to provide a tool of this kind which can be used in an effectual manner for weeding and hoeing.

The invention consists in the features of construction hereinafter described and specifically claimed.

The accompanying drawing is a side elevation of the tool with parts broken away for convenience of illustration.

As above referred to, the tool is especially applicable for weeding and hoeing, and it is adapted to be used by a person either sitting or kneeling, although it will be understood that by a longer handle it can be used by a person in a standing position. The said tool consists of a wire frame bent in the form shown in the drawing—that is to say, approximately elliptical. The tail end 1 of said tool, however, is a little wider than the head end 2, so as to adapt the tool for use in connection with different conditions of soil and various other conditions that may exist. The ends of the wire are bent at an angle, as shown at 3, and two flat pieces of wood 4 are securely fastened on either side of these bent ends of the frame to form a handle and to prevent the frame from turning. It will be seen from this description that a tool of this kind is extremely simple and inexpensive, while it has been found in use to be very effective, especially in weeding, not only in the manner in which the weeds can be removed from the ground, but the rapidity with which this can be accomplished. It will also be seen that the tool can be used in any manner in connection with tilling the soil as may be found convenient.

Having thus described my invention, what I claim as new, and desire to secure by Letters Patent, is—

A weeding-tool consisting of a piece of wire bent to form a loop and having angular end portions situated between plates securely fastened thereto, substantially as described.

In testimony whereof I have signed this specification in the presence of two subscribing witnesses.

SYLVANUS PERCIVAL.

Witnesses:
C. F. MAHONEY,
WALTER FISH.